(12) United States Patent
Yoshida et al.

(10) Patent No.: US 8,142,741 B2
(45) Date of Patent: Mar. 27, 2012

(54) REACTOR AND METHOD FOR MANUFACTURING REACTOR

(75) Inventors: Tatsuo Yoshida, Takasago (JP); Koji Noishiki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 301 days.

(21) Appl. No.: 12/483,634

(22) Filed: Jun. 12, 2009

(65) Prior Publication Data

US 2010/0178221 A1    Jul. 15, 2010

Related U.S. Application Data

(60) Provisional application No. 61/144,251, filed on Jan. 13, 2009.

(51) Int. Cl.
  *B01J 8/00*  (2006.01)
  *B01J 10/00*  (2006.01)
(52) U.S. Cl. ........ 422/602; 422/603; 422/650; 422/129; 366/336; 366/337; 366/340
(58) Field of Classification Search .................. 422/602, 422/603, 650, 129; 366/336, 337, 340
See application file for complete search history.

(56) References Cited

U.S. PATENT DOCUMENTS

| | | | | |
|---|---|---|---|---|
| 7,837,379 B2 * | 11/2010 | Fiering et al. | ............... | 366/181.5 |
| 2006/0275184 A1 * | 12/2006 | Furukawa et al. | ............ | 422/129 |
| 2007/0053808 A1 | 3/2007 | Markowz et al. | | |

FOREIGN PATENT DOCUMENTS

| | | |
|---|---|---|
| JP | 2004-290971 | 10/2004 |
| JP | 2006-122735 | 5/2006 |
| JP | 2006-255634 | 9/2006 |
| JP | 2006-523522 | 10/2006 |
| JP | 2007-61685 | 3/2007 |
| JP | 2008-168173 | 7/2008 |

OTHER PUBLICATIONS

U.S. Appl. No. 13/143,092, filed Jul. 1, 2011, Noishiki, et al.
U.S. Appl. No. 13/143,299, filed Jul. 5, 2011, Noishiki, et al.

* cited by examiner

*Primary Examiner* — Walter D Griffin
*Assistant Examiner* — Lessanework Seifu
(74) *Attorney, Agent, or Firm* — Oblon, Spivak, McClelland, Maier & Neustadt, L.L.P.

(57) ABSTRACT

A channel forming body of a reactor has a base plate, a first sealing member bonded to one surface of the base plate and a second sealing member bonded to the other surface of the base plate. A plurality of first inlet grooves forming first inlet paths and a plurality of reaction grooves forming reaction grooves are formed in parallel and side by side in one surface of the base plate. A plurality of second inlet grooves forming second inlet paths are formed in parallel and side by side in the other surface of the base plate. A plurality of junction holes forming junction channels penetrate the base plate from the one surface to the other surface between corresponding ones of the respective first and second inlet grooves and the reaction grooves corresponding to the inlet grooves to connect downstream ends of the inlet grooves and upstream ends of the reaction grooves.

4 Claims, 9 Drawing Sheets

REACTOR AND METHOD FOR MANUFACTURING REACTOR

BACKGROUND OF THE INVENTION

1. Field of the Invention

The present invention relates to a reactor and a method for manufacturing a reactor.

2. Background Art

It has been a conventional practice to produce a desired reaction product by reacting a first reactant and a second reactant with each other while permitting the flows of the both reactants held into contact. For example, a reactor provided with a channel forming body internally formed with a Y-shaped channel is used for the production of such a product. Specifically, in the channel forming body of this reactor, a Y-shaped groove is formed in one surface of one base plate and an opening of this Y-shaped groove is sealed by another base plate placed on the one surface of the base plate to form a channel. This channel is comprised of a first inlet path extending in a specified direction, a second inlet path extending in a direction different from the first inlet path, and a reaction channel connected with downstream sides of the both inlet paths. A first reactant is introduced into the first inlet path, whereas a second reactant is introduced into the second inlet path. Both of these two reactants flow into the reaction channel and, thereafter, react with each other while flowing in the reaction channel.

In recent years, it has been hoped to integrate many channels in a reactor for an improvement in the productivity of a product. In the case of integrating Y-shaped channels as above, it is thought to form many Y-shaped channels side by side along the above base plate in the channel forming body by forming many Y-shaped grooves side by side in the base plate. However, in this case, a large space is necessary for each channel because the first and second inlet paths of each channel extend in different directions, with the result that there is a limit in integrating the channels.

SUMMARY OF THE INVENTION

An object of the present invention is to promote further integration of channels in a reactor.

One aspect of the present invention is directed to a reactor for reacting first and second reactants while permitting the flows of the reactants, comprising a channel forming body internally formed with a plurality of channels each including a first inlet path having the first reactant introduced thereinto, a second inlet path having the second reactant introduced thereinto, a junction channel connected with a downstream side of the first inlet path and that of the second inlet path for causing the first reactant flowing via the first inlet path and the second reactant flowing via the second inlet path to join, and a reaction channel connected with a downstream side of the junction channel for reacting the both reactants joined in the junction channel with each other while permitting the flows of the reactants, wherein the channel forming body includes a base plate, a first sealing member bonded to one surface of the base plate while covering the one surface, and a second sealing member bonded to the other surface of the base plate while covering the other surface; a plurality of first inlet grooves for forming the first inlet paths are formed in parallel and side by side and a plurality of reaction grooves for forming the reaction grooves are formed in parallel and side by side in the one surface of the base plate while a plurality of second inlet grooves for forming the second inlet paths are formed in parallel and side by side in the other surface of the base plate; and a plurality of junction holes for forming the junction channels are so formed as to penetrate the base plate from the one surface to the other surface between the corresponding ones of the respective first and second inlet grooves and the reaction grooves corresponding to the inlet grooves so that the junction holes connect downstream ends of the inlet grooves and upstream ends of the reaction grooves.

Another aspect of the present invention is directed to a method for manufacturing a reactor comprising a channel forming body internally formed with a plurality of channels for permitting the flows of a first reactant and a second reactant, comprising a channel forming body forming step of forming the channel forming body such that each channel includes a first inlet path having the first reactant introduced thereinto, a second inlet path having the second reactant introduced thereinto, a junction channel connected with a downstream side of the first inlet path and that of the second inlet path for causing the first reactant flowing via the first inlet path and the second reactant flowing via the second inlet path to join, and a reaction channel connected with a downstream side of the junction channel for reacting the both reactants joined in the junction channel with each other while permitting the flows of the reactants, wherein the channel forming body forming step includes a first inlet groove forming step of forming a plurality of first inlet grooves for forming the first inlet paths in parallel and side by side in one surface of a base plate by etching; a reaction groove forming step of forming a plurality of reaction grooves for forming the reaction channels in parallel and side by side in the one surface of the base plate by etching; a second inlet groove forming step of forming a plurality of second inlet grooves for forming the second inlet paths in parallel and side by side in the other surface of the base plate by etching; a junction hole forming step of forming a plurality of junction holes for forming the junction channels by etching such that the junction holes penetrate the base plate so as to connect downstream ends of the corresponding first and second inlet grooves and connect the downstream ends of the first and second inlet grooves and upstream ends of the corresponding reaction grooves; a first sealing step of bonding a first sealing member to the one surface of the base plate to cover the one surface, thereby sealing openings of the respective first inlet grooves, the respective reaction grooves and the respective junction holes in the one surface; and a second sealing step of bonding a second sealing member to the other surface of the base plate to cover the other surface, thereby sealing openings of the respective second inlet grooves and the respective junction holes in the other surface.

DETAILED DESCRIPTION OF THE PREFERRED EMBODIMENTS OF THE INVENTION

Hereinafter, embodiments of the present invention are described with reference to the drawings.

First of all, with reference to FIGS. 1 to 9, the construction of a reactor according to one embodiment of the present invention is described.

Figure 1:
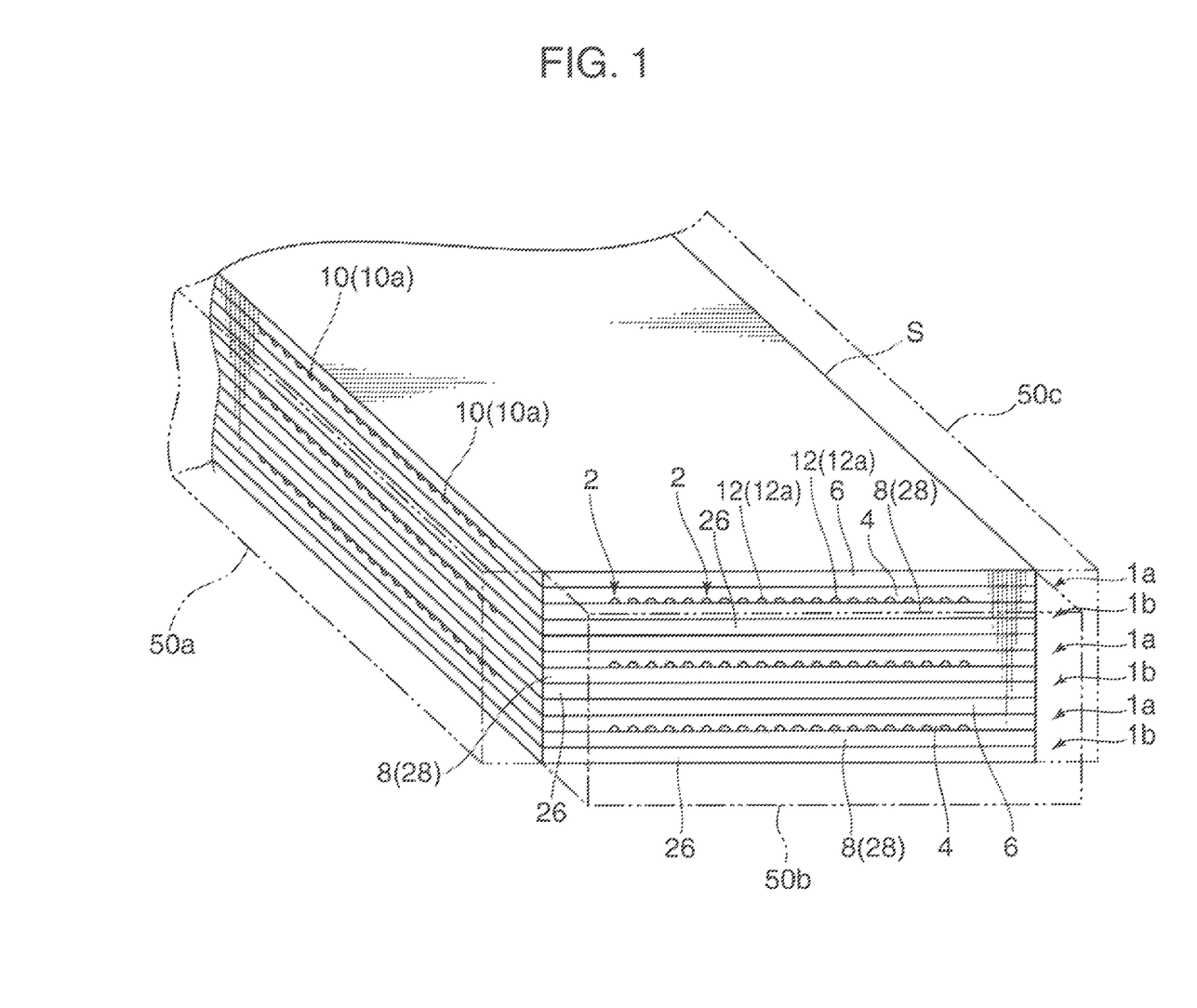
FIG. 1 is a perspective view showing a reactor according to one embodiment of the invention.

The reactor according to this embodiment is provided with a channel device S as shown in FIG. 1. This channel device S is formed by alternately laminating a plurality of first channel forming bodies 1a each internally formed with a plurality of channels 2 for permitting the flows of reactants and a plurality of second channel forming bodies 1b internally formed with a plurality of heating medium channels for permitting the flow of a heating medium. Out of these two channel forming bodies 1a, 1b, the first channel forming bodies 1a are embraced by the concept of the channel forming body of the present invention.

The reactor of this embodiment is generally called a microreactor and produces a desired reaction product by reacting first and second reactants while permitting the flows thereof in a plurality of microchannels 2 formed in the first channel forming bodies 1a.

Figure 2:
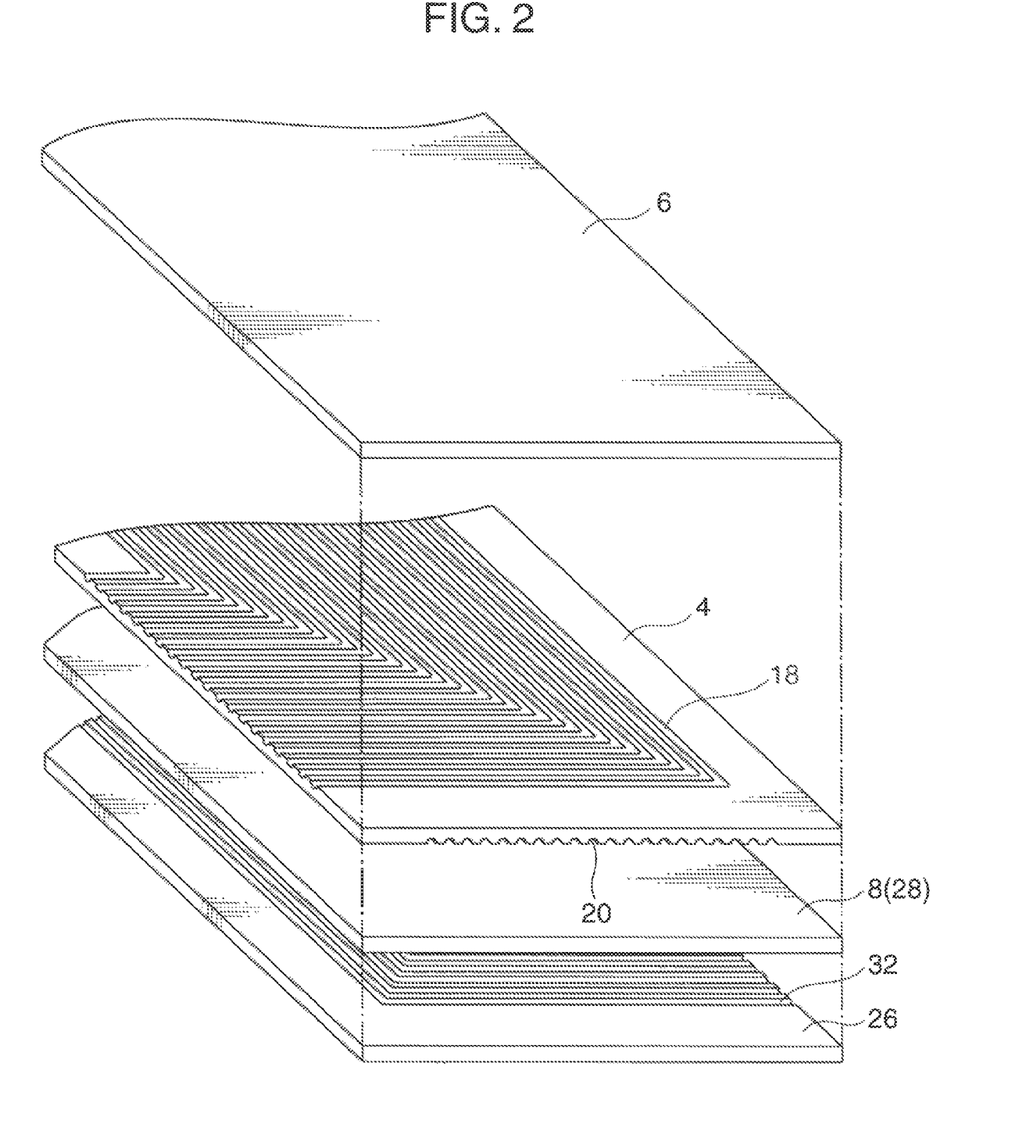
FIG. 2 is an exploded perspective view of first and second channel forming bodies constituting a channel device of the reactor shown in FIG. 1.

Specifically, each first channel forming body 1a is made up of a base plate 4, a first sealing member 6 and a second sealing member 8. These base plate 4, first sealing member 6 and second sealing member 8 are respectively rectangular flat boards as shown in FIG. 2. The first sealing member 6 is bonded to one surface of the base plate 4 while covering this one surface, and the second sealing member 8 is bonded to the other surface of the base plate 4 while covering this other surface. In other words, the sealing members 6, 8 and the base plate 4 are united with the base plate 4 sandwiched between the first and second sealing members 6, 8, thereby forming the first channel forming body 1a.

In the first channel forming body 1a, the plurality of channels 2 are formed side by side in a width direction of the first channel forming body 1a along the base plate 4. Each channel 2 is comprised of a first inlet path 10 having the first reactant introduced thereinto, a second inlet path 12 having the second reactant introduced thereinto, a junction channel 14 (see FIG. 6) connected with downstream sides of the first and second inlet paths 10, 12 for causing the first reactant flowing via the first inlet path 10 and the second reactant flowing via the second inlet path 12 to join, and a reaction channel 16 (see FIG. 6) connected with a downstream side of the junction channel 14 for reacting the two reactants joined in the junction channel 14 while permitting the flows thereof.

Figure 3:
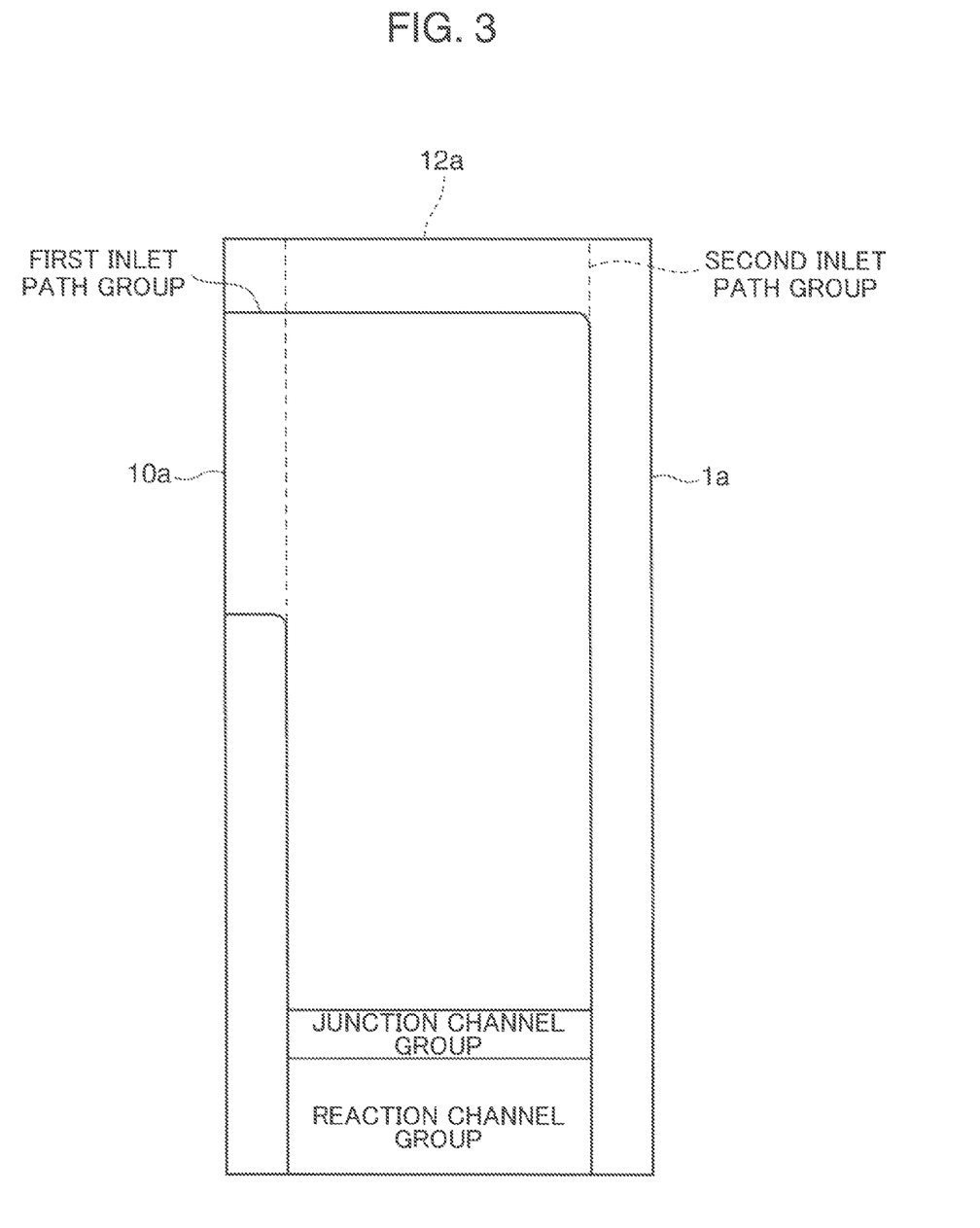
FIG. 3 is a diagram schematically showing a positional relationship of a first inlet path group, a second inlet path group, a junction portion group and a reaction channel group in the first channel forming body.

In the first channel forming body 1a, a group made up of the first inlet paths 10 of the respective channels 2, a group made up of the second inlet paths 12 of the respective channels 2, a group made up of the junction channels 14 of the respective channels 2 and a group made up of the reaction channels 16 of the respective channels 2 are arranged in such a positional relationship as shown in FIG. 3.

Each first inlet path 10 has an inlet opening 10a at one widthwise end of the first channel forming body 1a, extends straight in the width direction of the first channel forming body 1a from the inlet opening 10a, is bent by 90° and extends straight in a longitudinal direction of the first channel forming body 1a. A first reactant supply unit 50a (see FIG. 1) is connected with the inlet openings 10a of the respective first inlet paths 10, and the first reactant is introduced from the first reactant supply unit 50a while being distributed among the respective first inlet paths 10.

The respective first inlet paths 10 have different channel lengths. Specifically, the respective first inlet paths 10 are arranged side by side at equal intervals in the width direction of the first channel forming body 1a, and the first inlet paths 10 arranged more outward at bending positions of the respective first inlet paths 10 have longer channel lengths than those arranged more inward. Here, in each first inlet path 10, equivalent diameters of the respective sections are properly set according to the channel length, whereby total pressure losses of the respective first inlet paths 10 are set to an equal value.

Figure 4:
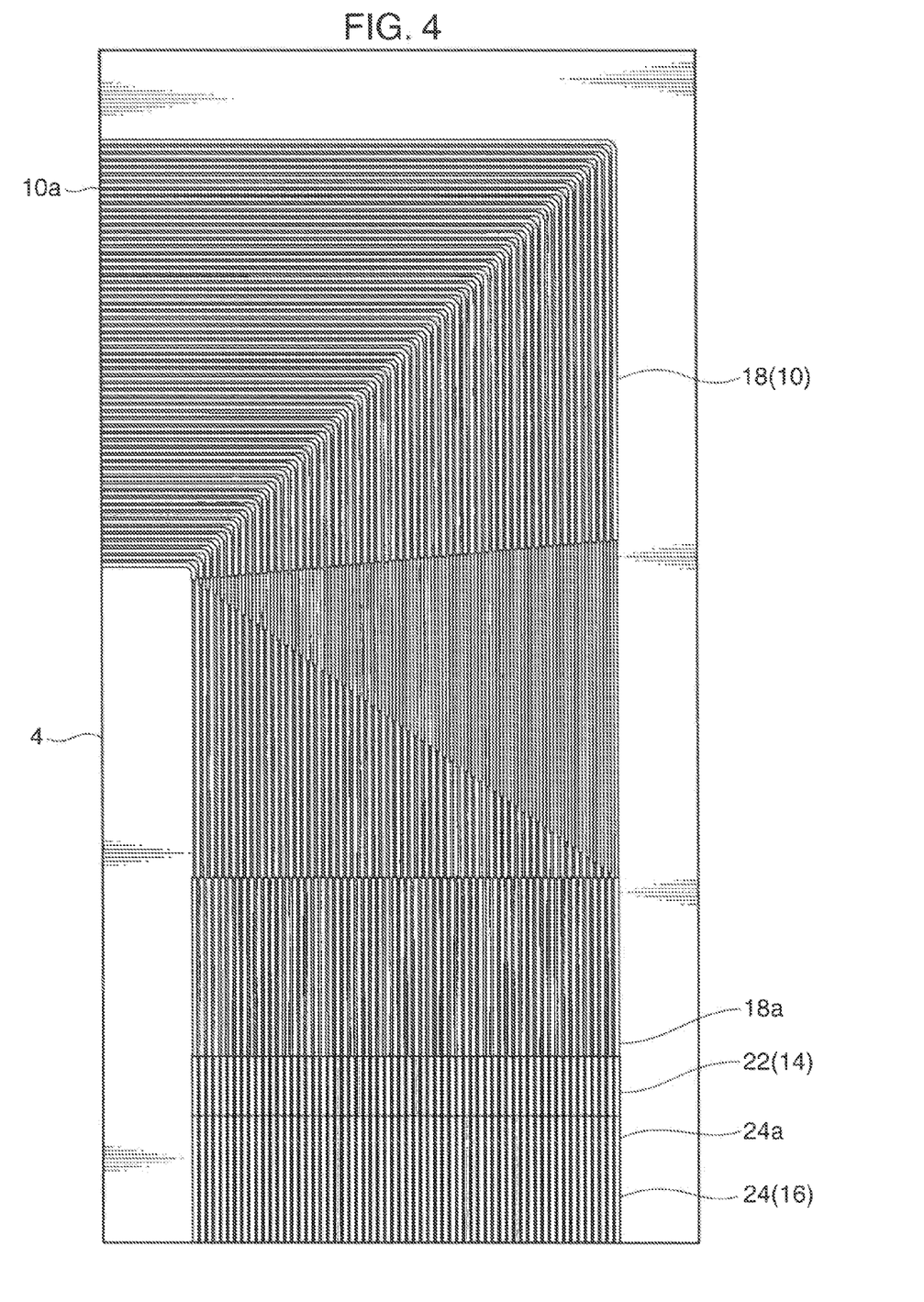
FIG. 4 is a plan view of one surface of a base plate forming the first channel forming body.
Figure 5:
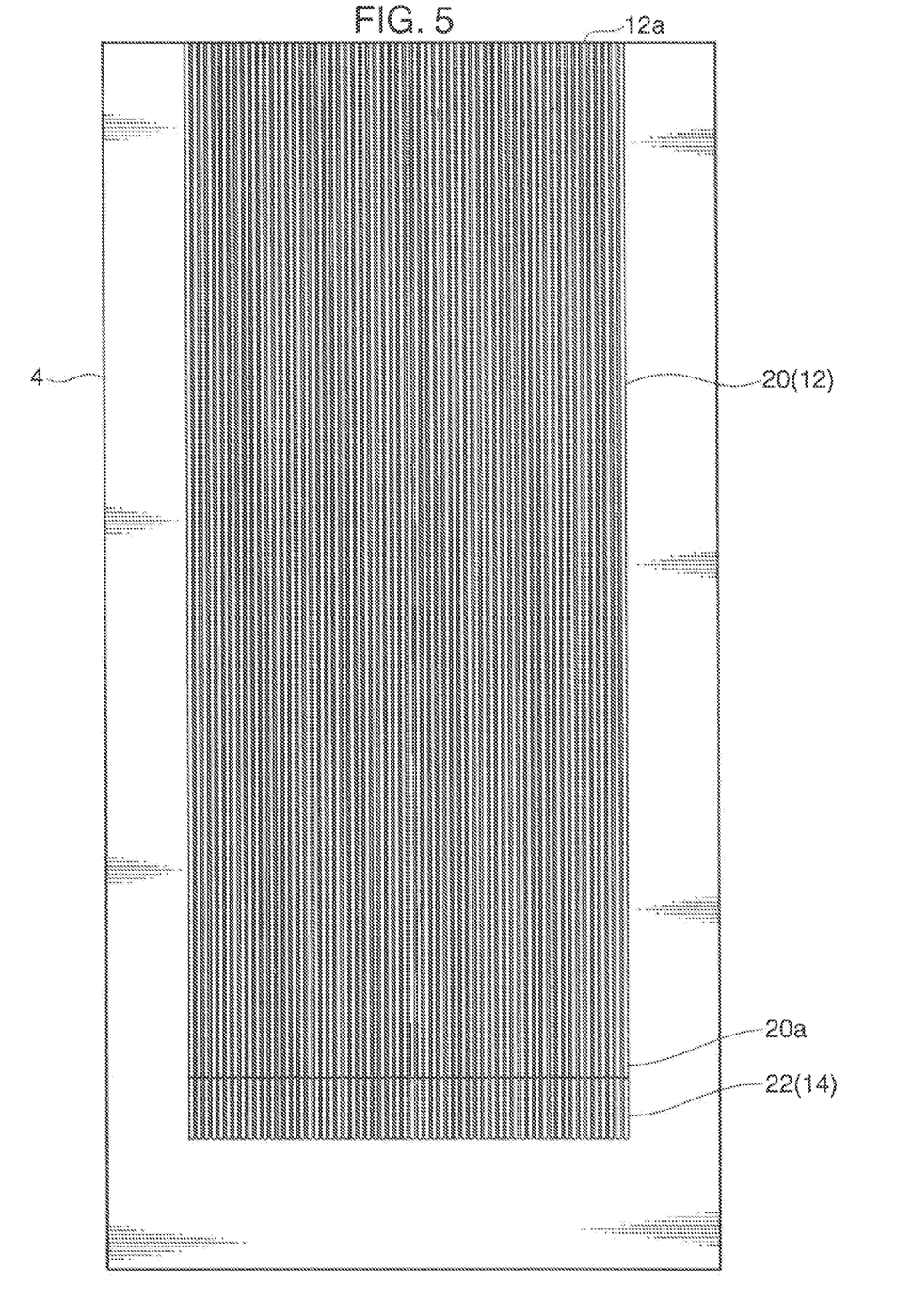
FIG. 5 is a plan view of the other surface of the base plate forming the first channel forming body.
Figure 6:
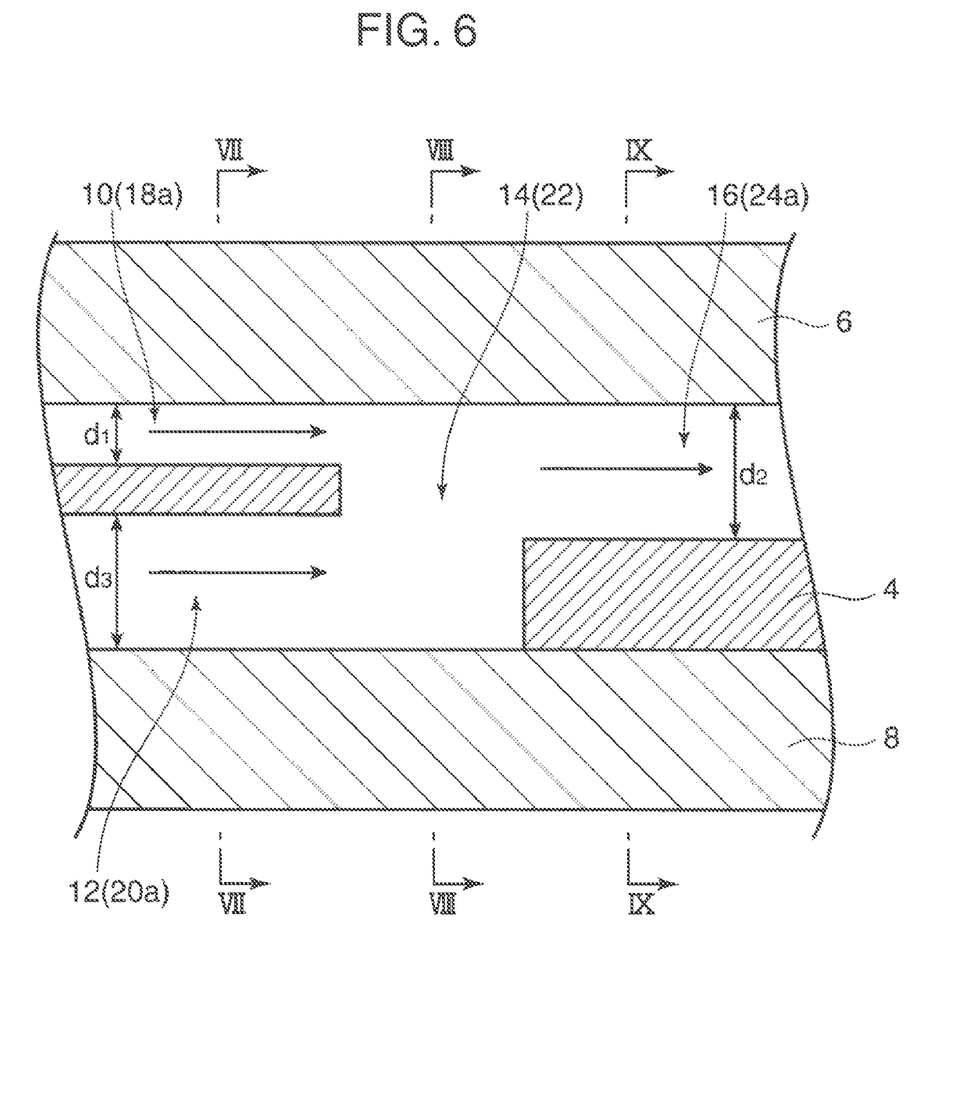
FIG. 6 is a section along a channel of a part of the first channel forming body near a junction channel.
Figure 7:
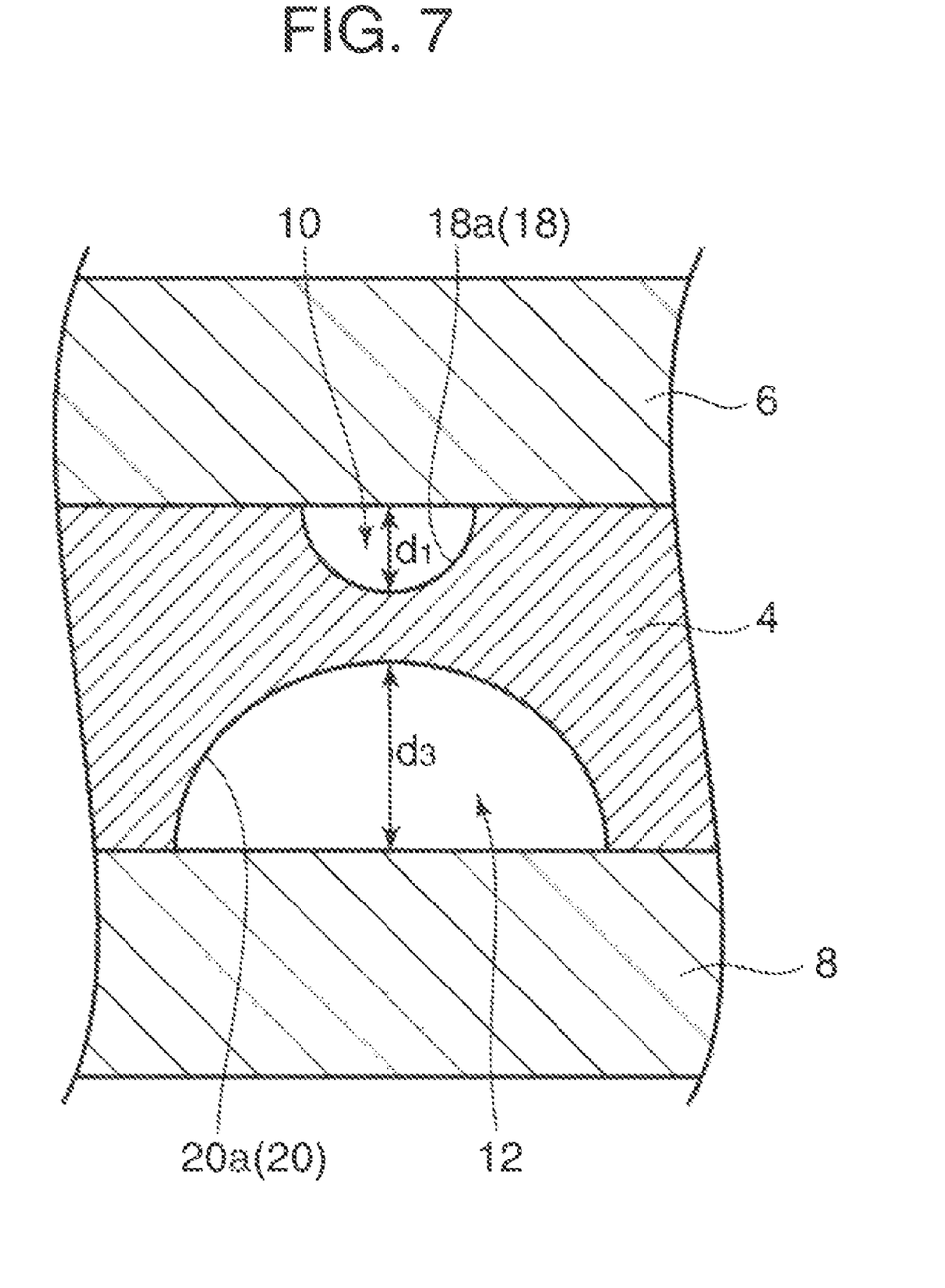
FIG. 7 is a partial section of the first channel forming body along VII-VII of FIG. 6.

Specifically, each first inlet path 10 has a downstream end portion having a semicircular cross sectional shape in a cross section orthogonal to a flowing direction of the first reactant as shown in FIG. 7 and includes sections different in equivalent diameter by changing the width as shown in FIG. 4. The longer channel length the first inlet path 10 has, the larger pressure loss it has as compared with the first inlet paths 10 having shorter channel lengths. By suitably setting the equivalent diameters of the respective sections of the first inlet paths 10, pressure loss differences resulting from channel length differences are eliminated to make the pressure losses of the respective first inlet paths 10 uniform. Specifically, smaller equivalent diameter sections of the first inlet paths 10 have larger pressure losses, whereas larger equivalent diameter sections thereof have smaller pressure losses. Thus, the larger equivalent diameter sections, i.e. larger width sections are increased and the smaller equivalent diameter sections, i.e. smaller width sections are decreased for the first inlet paths 10 having longer channel lengths, whereby the total pressure losses of the respective first inlet paths 10 are made more uniform. Since the pressure losses of the respective first inlet paths 10 are made more uniform, the flow rate of the first reactant distributed among the respective first inlet paths 10 from the reactant supply unit is made uniform.

Each second inlet path 12 has an inlet opening 12a at one longitudinal end of the first channel forming body 1a and extends straight in the longitudinal direction of the first channel forming body 1a from the inlet opening 12a. Each second inlet path 12 is arranged to overlap the section of the corresponding first inlet path 10 extending in the longitudinal direction of the first channel forming body 1a in a thickness direction of the first channel forming body 1a and arranged in parallel with this section. A second reactant supply unit 50b (see FIG. 1) is connected with the inlet openings 12a of the respective second inlet paths 12, and the second reactant is introduced to the respective second inlet paths 12 from the second reactant supply unit 50b while being distributed among them.

The respective second inlet paths 12 are arranged side by side at equal intervals in the width direction of the first channel forming body 1a. Each second inlet path 12 has a semicircular cross-sectional shape in a cross section orthogonal to a flowing direction of the second reactant as shown in FIG. 7, has a constant width over the entire length and a constant equivalent diameter over the entire length. The respective second inlet paths 12 have equal channel length and equivalent diameter. Thus, total pressure losses of the respective second inlet paths 12 are equal. Since the pressure losses of the respective second inlet paths 12 are equal, the flow rate of the second reactant distributed among and flowing into the respective second inlet paths 12 from the second reactant supply unit 50b is made uniform.

Figure 8:
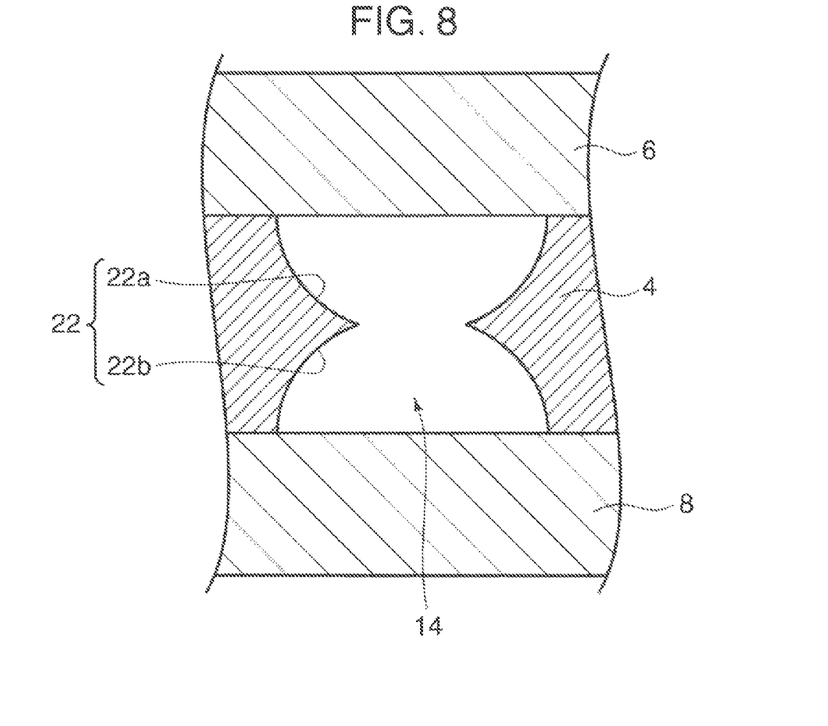
FIG. 8 is a partial section of the first channel forming body along VIII-VIII of FIG. 6.

Each junction channel 14 is connected with downstream sides of the corresponding first and second inlet paths 10, 12 and extends straight in the same direction as the section of the first inlet path 10 extending in the longitudinal direction of the first channel forming body 1a and the second inlet path 12. Specifically, the section of the corresponding first inlet path 10 extending in the longitudinal direction of the first channel forming body 1a and the corresponding second inlet path 12 join into the junction channel 14 in the same direction. This junction channel 14 is for joining the first reactant flowing via the first inlet path 10 and the second reactant flowing via the second inlet path 12 while permitting the flows of these reactants in the longitudinal direction of the first channel forming body 1a. Each junction channel 14 has such a cross-sectional shape obtained by connecting two semicircles near tops of their arcs in a cross section orthogonal to the longitudinal direction as shown in FIG. 8, and has an equivalent diameter larger than those of the first inlet path 10 and the second inlet path 12.

Figure 9:
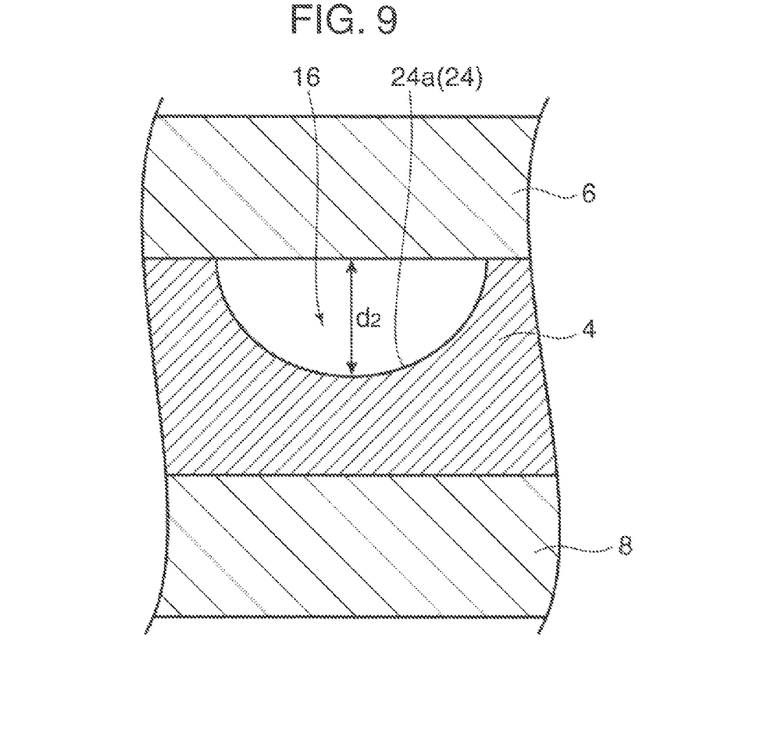
FIG. 9 is a partial section of the first channel forming body along IX-IX of FIG. 6.

Each reaction channel 16 is connected with a downstream side of the corresponding junction channel 14 and extends straight in the same direction as the junction channel 14. This reaction channel 16 is for reacting the first and second reactants joined in the junction channel 14 with each other while permitting the flows of these reactants in the longitudinal direction of the first channel forming body 1a. The respective reaction channels 16 are formed in one surface of the base plate 4 of the first channel forming body 1a and are arranged side by side at equal intervals in the width direction of the first channel forming body 1a. Each reaction channel 16 has a semicircular cross-sectional shape in a cross section orthogonal to the longitudinal direction as shown in FIG. 9, has a constant width over the entire length and a constant equivalent diameter over the entire length. The respective reaction channels 16 have equal channel length and equal equivalent diameter. Thus, pressure losses of the respective reaction channels 16 are equal.

In this embodiment, first inlet grooves 18 for forming the respective first inlet paths 10, second inlet grooves 20 for forming the respective second inlet paths 12, junction holes 22 for forming the respective junction channels 14 and reaction grooves 24 for forming the respective reaction channels 16 are respectively formed in the base plate 4, and the respective channels 2 in the first channel forming body 1a are formed only by covering openings of the respective grooves 18, 20 and 24 and openings of the respective junction holes 22 by the sealing members 6, 8.

Specifically, a plurality of first inlet grooves 18 (see FIG. 4) are formed in parallel and side by side in the one surface of the base plate 4, and the openings of the respective first inlet grooves 18 formed in the one surface of the base plate 4 are sealed by the first sealing member 6, whereby the respective first inlet paths 10 are formed. Accordingly, the respective first inlet paths 10 are arranged in parallel and side by side in the one surface side of the base plate 4 in the first channel forming body 1a. Further, each first inlet groove 18 includes a first inlet groove connecting section 18a connected with the junction hole 22 to be described later, and this first inlet groove connecting section 18a has a depth $d_1$ (see FIG. 6).

This depth $d_1$ is embraced by the concept of a first depth of the present invention and each first inlet groove 18 has the uniform depth $d_1$ over the entire length. The first inlet groove connecting section 18a has a semicircular cross-sectional shape in a cross section orthogonal to the flowing direction of the first reactant. A section of each first inlet groove 18 other than the first inlet groove connecting section 18a and corresponding to the sections of the first inlet path 10 having different equivalent diameters has a varying width while having the constant depth $d_1$.

A plurality of second inlet grooves 20 (see FIG. 5) are formed in parallel and side by side in the other surface of the base plate 4, and the openings of the respective second inlet grooves 20 formed in the other surface of the base plate 4 are sealed by the second sealing member 8 to form the respective second inlet paths 12. Accordingly, the respective second inlet paths 12 are arranged side by side and in parallel in the other surface side of the base plate 4 in the first channel forming body 1a. Further, each second inlet groove 20 includes a second inlet groove connecting section 20a connected with the junction hole 22 to be described later, and this second inlet groove connecting section 20a has a depth $d_3$ (see FIG. 6). This depth $d_3$ is embraced by the concept of a third depth of the present invention and is larger than a difference between the thickness of the base plate 4 and a depth $d_2$ of the reaction groove 24 to be described later and smaller than a difference between the thickness of the base plate 4 and the depth $d_1$ of the first inlet groove 18. Each second inlet groove 20 has the uniform depth $d_3$ over the entire length. Each second inlet groove 20 has a semicircular cross-sectional shape in a cross section orthogonal to the flowing direction of the second reactant.

Each junction channel 14 is formed by sealing both openings of each junction hole 22 formed in the base plate 4. Specifically, a plurality of junction holes 22 are formed side by side in the base plate 4 in the width direction of the base plate 4. Each junction hole 22 penetrates the base plate 4 from the one surface to the other surface between the corresponding first and second inlet grooves 18, 20 and the reaction groove 24 to be described later and corresponding to the inlet grooves 18, 20, and connects the downstream ends of the corresponding inlet grooves 18, 20 and an upstream end of the corresponding reaction groove 24. The opening of each junction hole 22 formed in the one surface of the base plate 4 is sealed by the first sealing member 6 and the opening thereof formed in the other surface of the base plate 4 is sealed by the second sealing member 8, whereby each junction channel 14 is formed. Each junction hole 22 has such a cross-sectional shape obtained by connecting two semicircles near tops of their arcs in a cross section orthogonal to the longitudinal direction in conformity with the cross-sectional shape of the junction channel 14.

A plurality of reaction grooves 24 (see FIG. 4) are formed in parallel and side by side in the one surface of the base plate 4, and the openings of the respective reaction grooves 24 formed in the one surface of the base plate 4 are sealed by the first sealing member 6 to form the respective reaction channels 16. Each reaction groove 24 includes a reaction groove connecting section 24a connected with the junction hole 22, and this reaction groove connecting section 24a has the depth $d_2$ (see FIG. 6). This depth $d_2$ is embraced by the concept of a second depth of the present invention and is larger than the depth $d_1$ of the first inlet groove 18 and equal to the depth $d_3$ of the second inlet groove 20. The sum of the depths $d_2$, $d_3$ is set to be larger than the thickness of the base plate 4. Each reaction groove 24 has the uniform depth $d_3$ over the entire length. Each reaction groove 24 has a semicircular cross-sectional shape in a cross section orthogonal to the longitudinal direction thereof.

The bottom surfaces of the reaction groove connecting sections 24a are closer to the other surface of the base plate 4 than those of the first inlet groove connecting sections 18a and steps are formed between the bottom surfaces of the first inlet groove connecting sections 18a and those of the reaction groove connecting sections 24a since the depth $d_2$ of the reaction groove connecting sections 24a is larger than the depth $d_1$ of the first inlet grooves 18 as described above. Thus, the first reactant flows toward the downstream side while moving toward the other surface of the base plate 4 in paths from the first inlet groove connecting sections 18a to the reaction groove connecting sections 24a via the junction holes 22. On the other hand, since the second inlet grooves 20 are formed in the other surface of the base plate 4 and the reaction grooves 24 are formed in the one surface of the base plate 4, paths reaching from the second inlet grooves 20 to the reaction grooves 24 via the junction holes 22 are bent and the second reactant flowing in these paths flows toward the downstream side while moving toward the one surface of the base plate 4.

Each second channel forming body 1b is internally formed with a plurality of heating medium channels (not shown) for permitting the flow of the heating medium as described above. These plurality of heating medium channels are arranged at equal intervals in the second channel forming body 1b in the width direction of the second channel forming body 1b. The respective heating medium channels include unillustrated inlet openings in a surface opposite to the surface formed with the inlet openings 12a of the second inlet paths 12 in the channel device S, and are bent by 90° and extend straight in the longitudinal direction of the second channel forming body 1b after extending straight in the width direction of the second channel forming body 1b from the inlet openings. Sections of the respective heating medium channels extending in the longitudinal direction of the second channel forming body 1b are arranged at positions corresponding to the sections of the first inlet paths 10 extending in the longitudinal direction of the first channel forming body 1a and the respective reaction channels 16.

This second channel forming body 1b is made up of a heating medium channel base plate 26 and a sealing member 28. These heating medium channel base plate 26 and sealing member 28 are flat boards of the same rectangular shape as the base plate 4, the first sealing member 6 and the second sealing member 8, and the sealing member 28 doubles as the second sealing member 8. The sealing member 28 is bonded to a surface of the heating medium channel base plate 26 while covering this surface. The respective heating medium channels are formed by sealing openings of grooves 32 (see FIG. 2) formed in the surface of the heating medium channel base plate 26 by the sealing member 28.

A heating member supply unit 50c (see FIG. 1) is connected with the inlet openings of the respective heating medium channels, and the heating medium is introduced into the respective heating medium channels from the heating medium supply unit 50c while being distributed. Thus, heat exchange is carried out between the heating medium flowing in the respective heating medium channels and the first and second reactants flowing in the respective reaction channels 16 of the first channel forming body 1a, thereby promoting the reaction of the first and second reactants in the respective reaction channels 16.

Next, a method for manufacturing the reactor of this embodiment is described.

In the method for manufacturing the reactor of this embodiment, a plurality of channels 2 are formed in the first channel forming body 1a and the first channel forming body 1a is formed such that each channel 2 is made up of the first inlet path 10, the second inlet path 12, the junction channel 14 and the reaction channel 16.

Specifically, a plurality of said first inlet grooves 18, a plurality of said reaction grooves 24 and sections 22a (see FIG. 8) of a plurality of said junction holes 22 having a specified depth from the one surface of the base plate 4 are respectively formed in the one surface of the base plate 4 by photoetching, and a plurality of said second inlet grooves 20 and sections 22b (see FIG. 8) of a plurality of said junction holes 22 having a specified depth from the other surface of the base plate 4 are respectively formed in the other surface of the base plate 4 by photoetching.

At this time, both surfaces of the base plate 4 are smoothed and cleaned and, then, photoresist is applied to these both surfaces of the base plate 4. Areas on one surface of the base plate 4 other than formation areas of the respective first inlet grooves 18, the respective reaction grooves 24 and the respective junction holes 22 are exposed with light via a photomask, and areas on the other surface of the base plate 4 other than formation areas of the respective second inlet grooves 20 and the respective junction holes 22 are exposed with light via another photomask. Thereafter, parts of the photoresist not exposed with light are removed from the both surfaces of the base plate 4 to expose the formation areas of the respective first inlet grooves 18, the respective second inlet grooves 20, the respective reaction grooves 24 and the respective junction holes 22.

Next, only the formation area of the first inlet grooves 18 on the one surface of the base plate 4 is covered by a covering member such as a masking tape and, thereafter, an etching liquid is sprayed onto the both surfaces of the base plate 4 to simultaneously apply etching to the both surfaces. At this time, the formation area of the respective first inlet grooves 18 covered by the covering member is not etched and only the exposed formation areas of the respective second inlet grooves 20, the respective reaction grooves 24 and the respective junction holes 22 are etched. After the formation area of the respective reaction grooves 24 and that of the respective junction holes 22 are etched to a depth corresponding to a difference between the above depth $d_2$ (=the above depth $d_3$) and the above depth $d_1$ from the one surface of the base plate 4 and the formation area of the respective second inlet grooves 20 and that of the respective junction holes 22 are etched to a similar depth from the other surface of the base plate 4, etching is temporarily stopped.

Thereafter, the covering member is removed and the formation area of the respective first inlet grooves 18 is exposed, and then etching is resumed. In this resumed etching process, at the same time as the formation area of the respective first inlet grooves 18, that of the respective reaction grooves 24 and that of the respective junction holes 22 are etched by the depth $d_1$ from the one surface of the base plate 4, the formation area of the respective second inlet grooves 20 and that of the respective junction holes 22 are etched by a similar depth from the other surface of the base plate 4. In this way, the respective first inlet grooves 18 of the depth $d_1$ from the one surface of the base plate 4 are formed and the formation area of the respective second inlet grooves 20 and that of the respective reaction grooves 24 are etched to a depth of $(d_2-d_1)+d_1=d_2$, whereby the respective reaction grooves 24 of the depth $d_2$ from the one surface of the base plate 4 and the respective second inlet grooves 20 of the depth $d_2=d_3$ from the other surface of the base plate 4 are formed. Further, the formation areas of the respective junction holes 22 are etched to the same depth $d_2$ as the reaction grooves 24 from the one surface of the base plate 4 and etched to the same depth $d_3$ as the second inlet grooves 20 from the other surface of the base plate 4. In this way, sections 22a etched to the depth $d_2$ from the one surface of the base plate 4 and sections 22b etched to the depth $d_3$ from the other surface of the base plate 4 are connected, so that the respective junction holes 22 penetrate the base plate 4. In other words, the respective junction holes 22 are formed utilizing etching to form the respective reaction grooves 24 and etching to form the respective second inlet grooves 20. Thereafter, the base plate 4 is cleaned and resist films are removed.

In another process, a plurality of said grooves 32 are formed in the heating medium channel base plate 26 forming the second channel forming body 1b. Specifically, the plurality of grooves 32 are formed in one surface of the heating medium channel base plate 26 by photoetching similar to the above.

Finally, the base plates 4 and the heating medium channel base plates 26 etched as above, the first sealing members 6 and the second sealing members 8 (sealing member 28) are placed one above another as shown in FIG. 1 and united by diffusion bonding to fabricate the channel device S.

Other constituent members such as the first reactant supply unit 50a, the second reactant supply unit 50b and the heating medium supply unit 50c are attached to the thus fabricated channel device S to manufacture the reactor of this embodiment.

Next, a reaction method using the reactor of this embodiment is described.

In this reaction method, the first reactant is introduced into the first inlet paths 10 of the respective channels 2 from the first reactant supply unit 50a and the second reactant is introduced into the second inlet paths 12 of the respective channels 2 from the second reactant supply unit 50b. The first reactant flows in the respective first inlet paths 10 while being distributed at a uniform flow rate since the total pressure losses of the respective first inlet paths 10 are made uniform. The second reactant flows in the respective second inlet paths 12 while being distributed at a uniform flow rate since the total pressure losses of the respective second inlet paths 12 are made uniform.

The first reactant having passed through the first inlet paths 10 and the second reactant having passed through the second inlet paths 12 join into the junction channels 14 while moving in directions toward each other, and are uniformly mixed. The joined two reactants flow into the reaction channels 16 from the junction channels 14 and react with each other while flowing toward the downstream sides in the reaction channels 16, whereby a specified reaction product is manufactured.

As described above, in this embodiment, the respective first inlet paths 10 of the plurality of channels 2 are formed in parallel and side by side in the one surface side of the base plate 4 forming the first channel forming body 1a and the respective second inlet paths 12 of the plurality of channels 2 are formed in parallel and side by side in the other surface side of the base plate 4. Thus, the respective inlet paths 10 (12) can be arranged in a more integrated manner in the one and the other surfaces of the base plate 4 as compared with the case where a plurality of Y-shaped channels are formed side by side in the one surface of the base plate 4 and first and second inlet paths extending in different directions are alternately arranged along the base plate 4. As a result, further integration of the channels 2 in the reactor can be promoted.

In the case of trying further integration of the channels by arranging the first and second inlet paths of the respective channels in the thickness direction of the channel forming body, it is also thought to form junction channels by laminating a first layer having a plurality of first inlet paths formed in parallel and side by side and a second layer having a plurality of second inlet paths formed in parallel and side by side and by placing downstream ends of the respective first inlet paths and those of the respective second inlet paths one above the other. However, in this case, there is a likelihood of displacing the positions of the downstream ends of the first inlet paths and those of the second inlet paths upon laminating the first and second layers. Such displacements may cause displacements of junction positions of the first and second reactants in the junction channels. Further, if the displacements of the downstream ends of the both inlet paths are large, the downstream ends of the first inlet paths may be placed on those of the second inlet paths located adjacent to the originally assigned second inlet paths and the reactants may leak.

In contrast, in this embodiment, the first and second inlet grooves 18, 20 are formed in the both surfaces of the base plate 4 forming the first channel forming body 1a, the junction holes 22 connecting the both inlet grooves 18, 20 are formed in the base plate 4 and the first and second sealing members 6, 8 to be bonded to the base plate 4 merely cover the respective grooves. Thus, there is no likelihood of displacing the positions of the downstream ends of the both inlet paths 10, 12 due to displacements of the base plate 4 and the respective sealing members 6, 8. Thus, in this embodiment, both the displacements of the junction positions of the first and second reactants in the junction channels 14 and the leakage of these reactants can be prevented.

Figure 10:
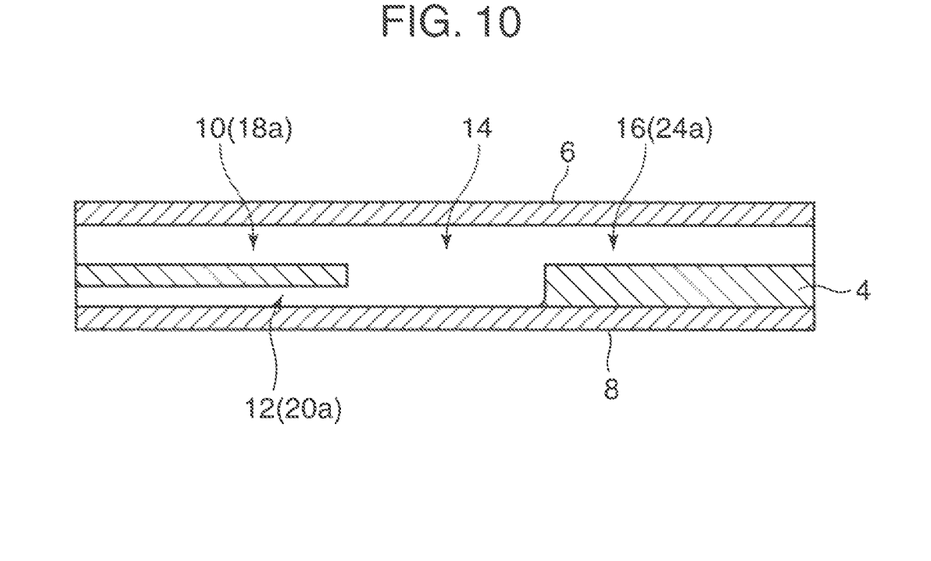
FIG. 10 is a section along a channel of a first channel forming body according to a comparative example of the embodiment of the invention.

Since the depth $d_2$ of the reaction groove connecting sections 24a is larger than the depth $d_1$ of the first inlet groove connecting sections 18a in this embodiment, the bottom surfaces of the reaction groove connecting sections 24a are located closer to the other surface of the base plate 4 than those of the first inlet groove connecting sections 18a. Thus, the first and second reactants can be more uniformly mixed as compared with the case where the bottom surfaces of the reaction groove connecting sections 24a and those of the first inlet groove connecting sections 18a are flush with each other as in a comparative example shown in FIG. 10. In other words, if the bottom surfaces of the reaction groove connecting sections 24a and those of the first inlet groove connecting sections 18a are flush with each other, the first reactant smoothly flows straight, whereas the second reactant joins the first reactant halfway. Thus, it is relatively difficult to sufficiently mix the second reactant with the first reactant. In contrast, in this embodiment, the first reactant flows toward the downstream side while moving toward the other surface of the base plate 4 since the bottom surfaces of the reaction groove connecting sections 24a are located closer to the other surface of the base plate 4 than those of the first inlet groove connecting sections 18a as described above. On the other hand, the paths reaching from the second inlet groove connecting sections 20a to the reaction groove connecting sections 24a via the junction holes 22 are bent and the second reactant flows in these paths toward the downstream side while moving toward the one surface of the base plate 4 since the second inlet groove connecting sections 20a are formed in the other surface of the base plate 4 and the reaction groove connecting sections 24a are formed in the one surface of the base plate 4. Thus, in this embodiment, the first and second reactants join and flow toward the downstream side while moving in directions toward each other, therefore the first and second reactants are sufficiently mixed and mixing uniformity of the both reactants can be improved.

Figure 11:
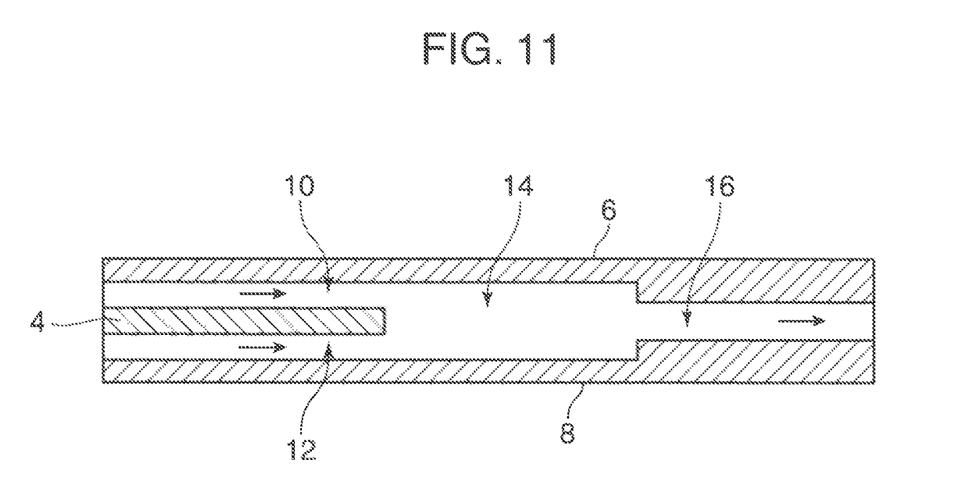
FIG. 11 is a section along a channel of a first channel forming body according to another comparative example of the embodiment of the invention.

A construction of another comparative example shown in FIG. 11 is also thought as the one for causing the first and second reactants to join while moving in the directions toward each other. In this another comparative example, a part of the first sealing member 6 corresponding to the reaction channels 16 projects toward the base plate 4 in the thickness direction and a part of the second sealing member 8 corresponding to the reaction channels 16 projects toward the base plate 4 in the thickness direction. By these both projecting parts, the paths reaching from the first inlet paths 10 to the reaction channels 16 via the junction channels 14 are bent such that the first reactant flows toward the downstream side while moving toward the other surface and the paths reaching from the second inlet paths 12 to the reaction channels 16 via the junction channels 14 are bent such that the second reactant flows toward the downstream side while moving toward the one surface of the base plate 4. By such a construction, in this comparative example shown in FIG. 11, the first and second reactants join while moving in the directions toward each other, with the result that the mixing uniformity of the both reactants is improved.

However, if it is tried to form a channel forming body with such a construction, it is necessary to etch the both sealing members 6, 8 such that only the parts of the both sealing members 6, 8 corresponding to the reaction channels 16 project in addition to forming the grooves corresponding to the first inlet paths 10, the second inlet paths 12, the reaction channels 16 and the junction channels 14 in the base plate 4 by etching the base plate 4, thereby increasing the etching steps. Further, the both sealing members 6, 8 need to be bonded to the base plate 4 while being positioned to fit the projecting parts thereof into the parts of the etched base plate 4 corresponding to the reaction channels 16, wherefore the process of bonding the sealing members 6, 8 and the base plate 4 becomes cumbersome. In other words, in the construction shown in FIG. 11, there is a problem of making the manufacturing process of the reactor cumbersome.

In contrast, in this embodiment, the first inlet grooves 18, the second inlet grooves 20, the reaction grooves 24 and the junction holes 22 are formed in the base plate 4 and the first inlet paths 10, the second inlet paths 12, the junction channels 14 and the reaction channels 16 are formed only by covering the openings of the respective grooves 18, 20 and 24 and the openings of the junction holes 22 by the first and second sealing members 6, 8. Thus, it is sufficient only to etch the base plate 4 for forming the channels 2 and it is not necessary to etch the both sealing members 6, 8. Thus, as compared with the above construction of FIG. 11, the number of etching steps can be reduced. Further, in this embodiment, the channels 2 are formed only by covering the openings of the respective grooves 18, 20 and 24 and those of the junction holes 22 formed in the base plate 4 by the sealing members 6, 8 bonded to the base plate 4. Thus, a cumbersome operation of bonding the both sealing members 6, 8 to the base plate 4 while positioning them with respect to the base plate 4 can be eliminated. Therefore, in this embodiment, it can be prevented to make the manufacturing process of the reactor cumbersome.

Since the respective junction holes 22 can be formed utilizing etching to form the respective reaction grooves 24 and etching to form the respective second inlet grooves 20 in this embodiment, the manufacturing process of the reactor can be simplified without separately necessitating a special etching step of forming the respective junction holes 22 or a step of forming the respective junction holes 22 by laser machining or the like.

Further, since the channel device S of the reactor includes a plurality of first channel forming bodies 1a placed one over another in this embodiment, further integration of the channels 2 in the reactor can be promoted and the productivity of the reaction product in the entire reactor can be more improved.

It should be appreciated that the embodiment disclosed this time is illustrative and not restrictive in all points. The scope of the present invention is indicated not by the above description of the embodiment, but by appended claims and embraces all changes within the meaning and scope equivalent to the appended claims.

For example, the first inlet paths 10, the second inlet paths 12, the junction channels 14 and the reaction channels 16 may be formed to have shapes and/or arrangements other than the above in the first channel forming body 1a.

For example, the respective first inlet paths 10 may be formed to extend straight in the longitudinal direction of the first channel forming body 1a. Further, the respective second inlet paths 12 may be formed to have bent shapes like the first inlet paths 10. Furthermore, the depth $d_3$ of the second inlet grooves 20 for forming the second inlet paths 12 may be smaller than the depth $d_1$ of the first inlet grooves 18.

The reactor needs not necessarily include a plurality of first channel forming bodies 1a and a plurality of second channel forming bodies 1b placed one over another as described above and may include only a single first channel forming body 1a.

In the above embodiment, the sections of the first inlet grooves 18, the second inlet grooves 20 and the reaction grooves 24 having the semicircular cross-sectional shapes may each have such a cross-sectional shape that a bottom surface part is a straight portion parallel to the base plate 4 and arcuate parts are connected at the opposite sides of the straight portion.

Although the depth $d_2$ of the reaction grooves 24 and the depth $d_3$ of the second inlet grooves 20 are equal in the above embodiment, these depths $d_2$ and $d_3$ may differ provided that the sum thereof is larger than the thickness of the base plate 4.

For example, if the depth $d_2$ is larger than the depth $d_3$, the first inlet grooves 18, the second inlet grooves 20, the reaction grooves 24 and the junction holes 22 are formed in the base plate 4 by the following etching process.

Specifically, similar to the above embodiment, areas of the both surfaces of the base plate 4 other than the formation areas of the respective first inlet grooves 18, the respective second inlet grooves 20, the respective reaction grooves 24 and the respective junction holes 22 are covered by photoresist exposed to light.

Subsequently, the formation area of the first inlet groove 18 on the one surface of the base plate 4 and the formation area of the second inlet grooves 20 on the other surface of the base plate 4 are covered by covering members such as masking tapes and then etching is simultaneously applied to the both surfaces of the base plate 4. At this time, after the exposed formation areas of the respective reaction grooves 24 and the respective junction holes 22 are etched to a depth $(d_2-d_3)$ equivalent to a difference between the depths $d_2$ and $d_3$ from the one surface of the base plate 4 and the formation area of the respective junction holes 22 is etched to a similar depth from the other surface of the base plate 4. Thereafter, the covering member covering the formation area of the second inlet grooves 20 is removed.

Thereafter, at the same time as the exposed formation areas of the respective reaction grooves 24 and the respective junction holes 22 are etched by a depth $(d_3-d_1)$ equivalent to a difference between the depths $d_3$ and $d_1$ from the one surface of the base plate 4, the formation areas of the respective second inlet grooves 20 and the respective junction holes 22 are etched by a similar depth from the other surface of the base plate 4. Thereafter, the covering member covering the formation area of the first inlet grooves 18 is removed.

Thereafter, at the same time as the exposed formation areas of the respective first inlet grooves 18, the respective reaction grooves 24 and the respective junction holes 22 are etched by the depth $d_1$ from the one surface of the base plate 4, the formation areas of the respective second inlet grooves 20 and the respective junction holes 22 are etched by a similar depth from the other surface of the base plate 4. In this way, the respective first inlet grooves 18 of the depth $d_1$ from the one surface of the base plate 4 are formed, and the formation area of the respective reaction grooves 24 is etched to a depth $(d_2-d_3)+(d_3-d_1)+d_1=d_2$ from the one surface of the base plate 4, whereby the respective reaction grooves 24 of the depth $d_2$ from the one surface of the base plate 4 are formed. Further, the formation area of the respective second inlet grooves 20 is etched to a depth $(d_3-d_1)+d_1=d_3$ from the other surface of the base plate 4, whereby the respective second inlet grooves 20 of the depth $d_3$ from the other surface of the base plate 4 are formed. Further, the formation area of the respective junction holes 22 is etched to the same depth $d_2$ as the reaction grooves 24 from the one surface of the base plate 4 while being etched to the same depth $d_3$ as the second inlet grooves 20 from the other surface of the base plate 4. In this way, sections etched to the depth $d_2$ from the one surface of the base plate 4 and sections etched to the depth $d_3$ from the other surface of the base plate 4 are connected, whereby the respective junction holes 22 penetrate the base plate 4. In other words, in this construction as well, the respective junction holes 22 are formed utilizing etching to form the respective reaction grooves 24 and etching to form the respective second inlet grooves 20.

Although the both surfaces of the base plate 4 are simultaneously etched in the above embodiment, the one and the other surfaces of the base plate 4 may be separately etched.

In the process of etching the base plate 4, at least the first inlet groove connecting sections 18a of the first inlet grooves 18 may be formed by etching the one surface of the base plate 4 to the depth $d_1$ and at least the reaction groove connecting sections 24a of the reaction grooves 24 may be formed by etching the one surface of the base plate 4 to the depth $d_2$. Further, in this process, at least second inlet groove connecting sections 20a of the second inlet grooves 20 may be formed by etching the other surface of the base plate 4 to the depth $d_3$. In other words, sections of the first inlet grooves 18 other than the first inlet groove connecting sections 18a may be formed to have a depth different from the depth $d_1$, sections of the reaction grooves 24 other than the reaction groove connecting sections 24a may be formed to have a depth different from the depth $d_2$, and sections of the second inlet grooves 20 other than the second inlet groove connecting sections 20a may be formed to have a depth different from the depth $d_3$. In this case, the junction holes 22 may be formed utilizing etching to form the reaction groove connecting sections 24a of the reaction grooves 24 and etching to form the second inlet groove connecting sections 20a of the second inlet grooves 20.

SUMMARY OF THE ABOVE EMBODIMENT

The above embodiment is summarized as follows.

Specifically, a reactor according to the above embodiment is for reacting first and second reactants while permitting the flows of the reactants and comprises a channel forming body internally formed with a plurality of channels each including a first inlet path having the first reactant introduced thereinto, a second inlet path having the second reactant introduced thereinto, a junction channel connected with a downstream side of the first inlet path and that of the second inlet path for causing the first reactant flowing via the first inlet path and the second reactant flowing via the second inlet path to join, and a reaction channel connected with a downstream side of the junction channel for reacting the both reactants joined in the junction channel with each other while permitting the flows of the reactants, wherein the channel forming body includes a base plate, a first sealing member bonded to one surface of the base plate while covering the one surface, and a second sealing member bonded to the other surface of the base plate while covering the other surface; a plurality of first inlet grooves for forming the first inlet paths are formed in parallel and side by side and a plurality of reaction grooves for forming the reaction grooves are formed in parallel and side by side in the one surface of the base plate while a plurality of second inlet grooves for forming the second inlet paths are formed in parallel and side by side in the other surface of the base plate; and a plurality of junction holes for forming the junction channels are so formed as to penetrate the base plate from the one surface to the other surface between the corresponding ones of the respective first and second inlet grooves and the reaction grooves corresponding to the inlet grooves so that the junction holes connect downstream ends of the inlet grooves and upstream ends of the reaction grooves.

This reactor can be formed by a method for manufacturing a reactor including a channel forming body internally formed with a plurality of channels for permitting the flows of a first reactant and a second reactant, the method comprising a channel forming body forming step of forming the channel forming body such that each channel includes a first inlet path having the first reactant introduced thereinto, a second inlet path having the second reactant introduced thereinto, a junction channel connected with a downstream side of the first inlet path and that of the second inlet path for causing the first reactant flowing via the first inlet path and the second reactant flowing via the second inlet path to join, and a reaction channel connected with a downstream side of the junction channel for reacting the both reactants joined in the junction channel with each other while permitting the flows of the reactants, wherein the channel forming body forming step includes a first inlet groove forming step of forming a plurality of first inlet grooves for forming the first inlet paths in parallel and side by side in one surface of a base plate by etching; a reaction groove forming step of forming a plurality of reaction grooves for forming the reaction channels in parallel and side by side in the one surface of the base plate by etching; a second inlet groove forming step of forming a plurality of second inlet grooves for forming the second inlet paths in parallel and side by side in the other surface of the base plate by etching; a junction hole forming step of forming a plurality of junction holes for forming the junction channels by etching such that the junction holes penetrate the base plate so as to connect downstream ends of the corresponding first and second inlet grooves and connect the downstream ends of the first and second inlet grooves and upstream ends of the corresponding reaction grooves; a first sealing step of bonding a first sealing member to the one surface of the base plate to cover the one surface, thereby sealing openings of the respective first inlet grooves, the respective reaction grooves and the respective junction holes in the one surface; and a second sealing step of bonding a second sealing member to the other surface of the base plate to cover the other surface, thereby sealing openings of the respective second inlet grooves and the respective junction holes in the other surface.

According to the above reactor and the method for manufacturing this reactor, the respective first inlet paths of the plurality of channels are formed in parallel and side by side in the one surface side of the base plate forming the channel forming body and the respective second inlet paths of the plurality of channels are formed in parallel and side by side in the other surface side of the base plate. Thus, the respective inlet paths can be arranged in a more integrated manner respectively in the one and the other surfaces of the base plate as compared with the case where a plurality of Y-shaped channels are formed side by side in the one surface side of the base plate and first and second inlet paths extending in different directions are alternately arranged along the base plate. As a result, further integration of the channels in the reactor can be promoted.

In the case of trying further integration of the channels by arranging the first and second inlet paths of the respective channels in the thickness direction of the channel forming body, it is also thought to form junction channels by laminating a first layer having a plurality of first inlet paths formed in parallel and side by side and a second layer having a plurality of second inlet paths formed in parallel and side by side and by placing downstream ends of the respective first inlet paths and those of the respective second inlet paths one above the other. However, in this case, there is a likelihood of displacing the positions of the downstream ends of the first inlet paths and those of the second inlet paths upon laminating the first and second layers. Such displacements may cause displacements of junction positions of the first and second reactants in the junction channels. Further, if the displacements of the downstream ends of the both inlet paths are large, such an inconvenience that the downstream ends of the first inlet paths are placed on those of the second inlet paths located adjacent to the originally assigned second inlet paths and the reactants leak occurs.

In contrast, in this embodiment, the first and second inlet grooves are formed in the both surfaces of the base plate forming the first channel forming body, the junction holes connecting the both inlet grooves are formed in the base plate and the first and second sealing members to be bonded to the base plate merely cover the respective grooves. Thus, there is no likelihood of displacing the positions of the downstream ends of the both inlet paths due to displacements of the base plate and the respective sealing members. Thus, in this embodiment, both the displacements of the junction positions of the first and second reactants in the junction channels and the leakage of these reactants can be prevented.

In the above reactor, a depth of sections of the reaction grooves connected with the junction holes is preferably larger than a depth of sections of the first inlet grooves connected with the junction holes.

According to such a construction, bottom surfaces of the sections of the reaction grooves connected with the junction holes are located closer to the other surface of the base plate than those of the sections of the first inlet grooves connected with the junction holes. Thus, more uniform mixing of the first and second reactants is possible as compared with the case where the bottom surfaces of the sections of the reaction grooves connected with the junction holes and those of the sections of the first inlet grooves connected with the junction holes are flush with each other. Specifically, if the bottom surfaces of the sections of the reaction grooves connected with the junction holes and those of the sections of the first inlet grooves connected with the junction holes are flush with each other, the first reactant smoothly flows straight, while the second reactant joins the first reactant halfway. In this case, it is relatively difficult to sufficiently mix the second reactant with the first reactant since the second reactant joins the first reactant halfway. In contrast, in the above construction, the first reactant flows toward the downstream side while moving toward the other surface of the base plate since the bottom surfaces of the sections of the reaction grooves connected with the junction holes are located closer to the other surface of the base plate than those of the sections of the first inlet grooves connected with the junction holes. On the other hand, paths reaching from the second inlet grooves to the reaction grooves via the junction holes are bent since the second inlet grooves are formed in the other surface of the base plate and the reaction grooves are formed in the one surface of the base plate, and the second reactant flowing in these paths flows toward the downstream side while moving toward the one surface of the base plate. In other words, in the above construction, the first and second reactants join and flow toward the downstream side while moving in directions toward each other, therefore the first and second reactants are sufficiently mixed and the mixing uniformity of the both reactants can be improved.

The reactor of such a construction can be manufactured by the above method for manufacturing the reactor, wherein the first inlet groove forming step includes a first inlet groove connecting section forming step of forming at least sections of the respective first inlet grooves connected with the junction holes by etching the one surface of the base plate to a first depth; the reaction groove forming step includes a reaction groove connecting section forming step of forming at least sections of the respective reaction grooves connected with the junction holes by etching the one surface of the base plate to a second depth larger than the first depth; the second inlet groove forming step includes a second inlet groove connecting section forming step of forming at least sections of the respective second inlet grooves connected with the junction holes by etching the other surface of the base plate to a third depth larger than a difference between the thickness of the base plate and the second depth and smaller than a difference between the thickness of the base plate and the first depth; the junction hole forming step includes a first step to be performed simultaneously with the reaction groove connecting section forming step and adapted to etch a formation area of the respective junction holes on the one surface of the base plate to the second depth, a second step to be performed simultaneously with the second inlet groove connecting section forming step and adapted to etch a formation area of the respective junction holes on the other surface of the base plate to the third depth; and sections etched to the second depths in the first step and sections etched to the third depth in the second step are connected so that the respective junction holes penetrate the base plate.

According to this reactor manufacturing method, the junction holes can be formed utilizing etching in the reaction groove connecting section forming step and etching in the second inlet groove connecting section forming step. Thus, the manufacturing process of the reactor can be simplified without separately necessitating a special etching step of forming the respective junction holes or a step of forming the respective junction holes by laser machining or the like.

The above reactor preferably comprises a plurality of said channel forming bodies placed one over another.

If such a construction is employed, further integration of the channels in the reactor can be promoted, thereby the productivity of a reaction product of the entire reactor can be more improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A reactor for reacting first and second reactants while permitting the flows of the reactants, comprising:

a channel forming body internally formed with a plurality of channels each including a first inlet path having the first reactant introduced thereinto, a second inlet path having the second reactant introduced thereinto, a junction channel connected with a downstream side of the first inlet path and that of the second inlet path for causing the first reactant flowing via the first inlet path and the second reactant flowing via the second inlet path to join, and a reaction channel connected with a downstream side of the junction channel for reacting the both reactants joined in the junction channel with each other while permitting the flows of the reactants, wherein:

the channel forming body includes a base plate, a first sealing member bonded to one surface of the base plate while covering the one surface, and a second sealing member bonded to the other surface of the base plate while covering the other surface;

a plurality of first inlet grooves for forming the first inlet paths are formed in parallel and side by side and a plurality of reaction grooves for forming the reaction grooves are formed in parallel and side by side in the one surface of the base plate while a plurality of second inlet grooves for forming the second inlet paths are formed in parallel and side by side in the other surface of the base plate; and a plurality of junction holes for forming the junction channels are so formed as to penetrate the base plate from the one surface to the other surface between the corresponding ones of the respective first and second inlet grooves and the reaction grooves corresponding to the inlet grooves so that the junction holes connect downstream ends of the inlet grooves and upstream ends of the reaction grooves, wherein each of the first inlet grooves has a linear portion extending from the downstream end of the first inlet groove to an upstream side of the first inlet groove, each of the second inlet grooves has a linear portion extending from the downstream end of the second inlet groove to an upstream side of the second inlet groove, and the linear portions of the first inlet grooves are arranged parallel to the linear portions of the second inlet grooves, and the linear portions of the paired first and second inlet grooves are arranged side by side in a thickness direction of the base plate.

2. The reactor according to claim 1, wherein a depth of sections of the reaction grooves connected with the junction holes is larger than a depth of sections of the first inlet grooves connected with the junction holes.

3. The reactor according to claim 1, comprising a plurality of said channel forming bodies placed one over another.

4. The reactor according to claim 1, wherein a depth of a section of the linear portions of the first inlet grooves, added to a depth of a section of the linear portions of the paired second inlet grooves, is less than a thickness of a section of the base plate.

\* \* \* \* \*